Aug. 25, 1964  A. D. CARACOES  3,145,480
SPACE PLEAT FANFOLD INDICATOR AND CALCULATOR DEVICE
Filed Nov. 22, 1961  3 Sheets-Sheet 1
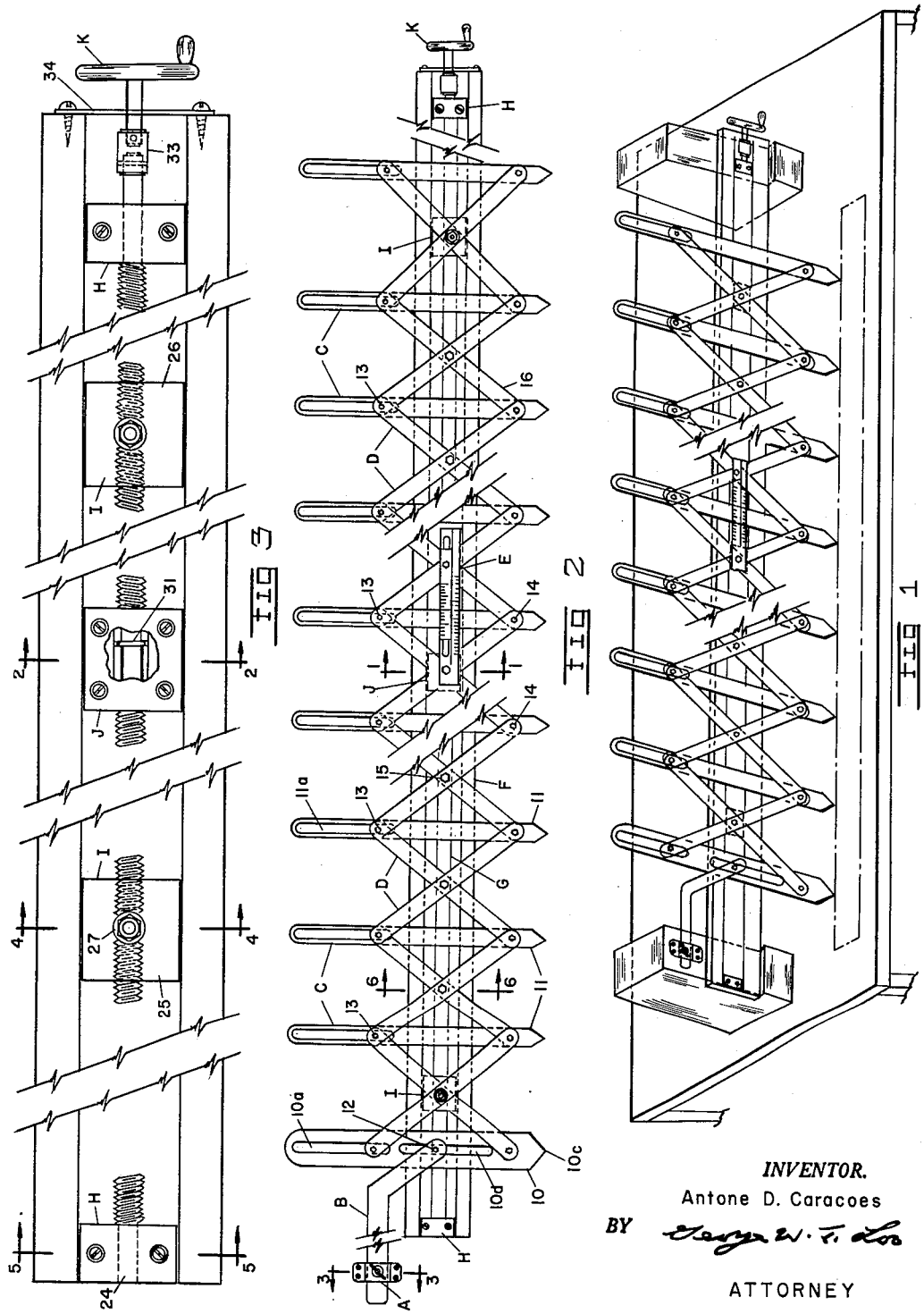
INVENTOR.
Antone D. Caracoes
BY
ATTORNEY

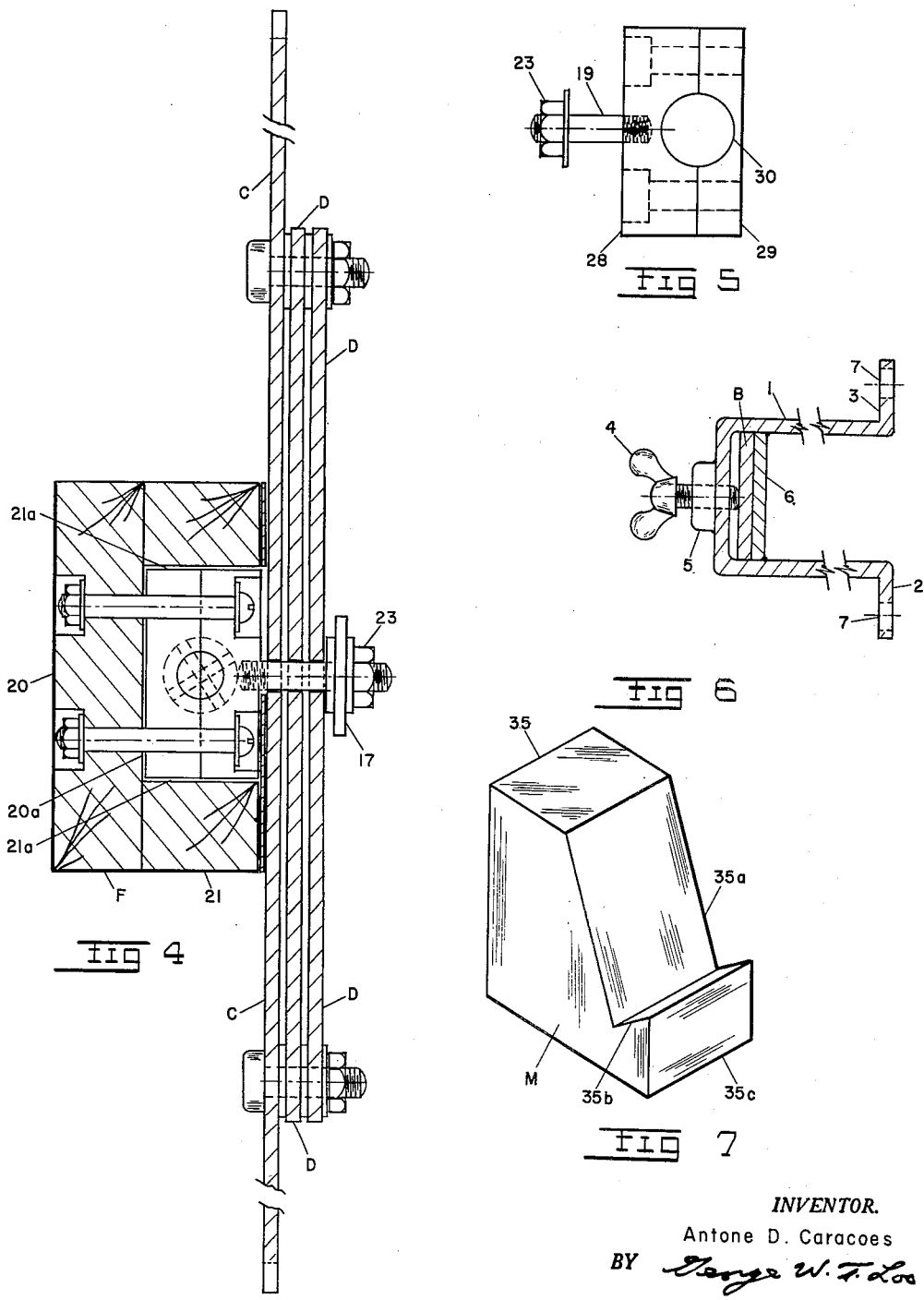

Aug. 25, 1964   A. D. CARACOES   3,145,480
SPACE PLEAT FANFOLD INDICATOR AND CALCULATOR DEVICE
Filed Nov. 22, 1961   3 Sheets-Sheet 3
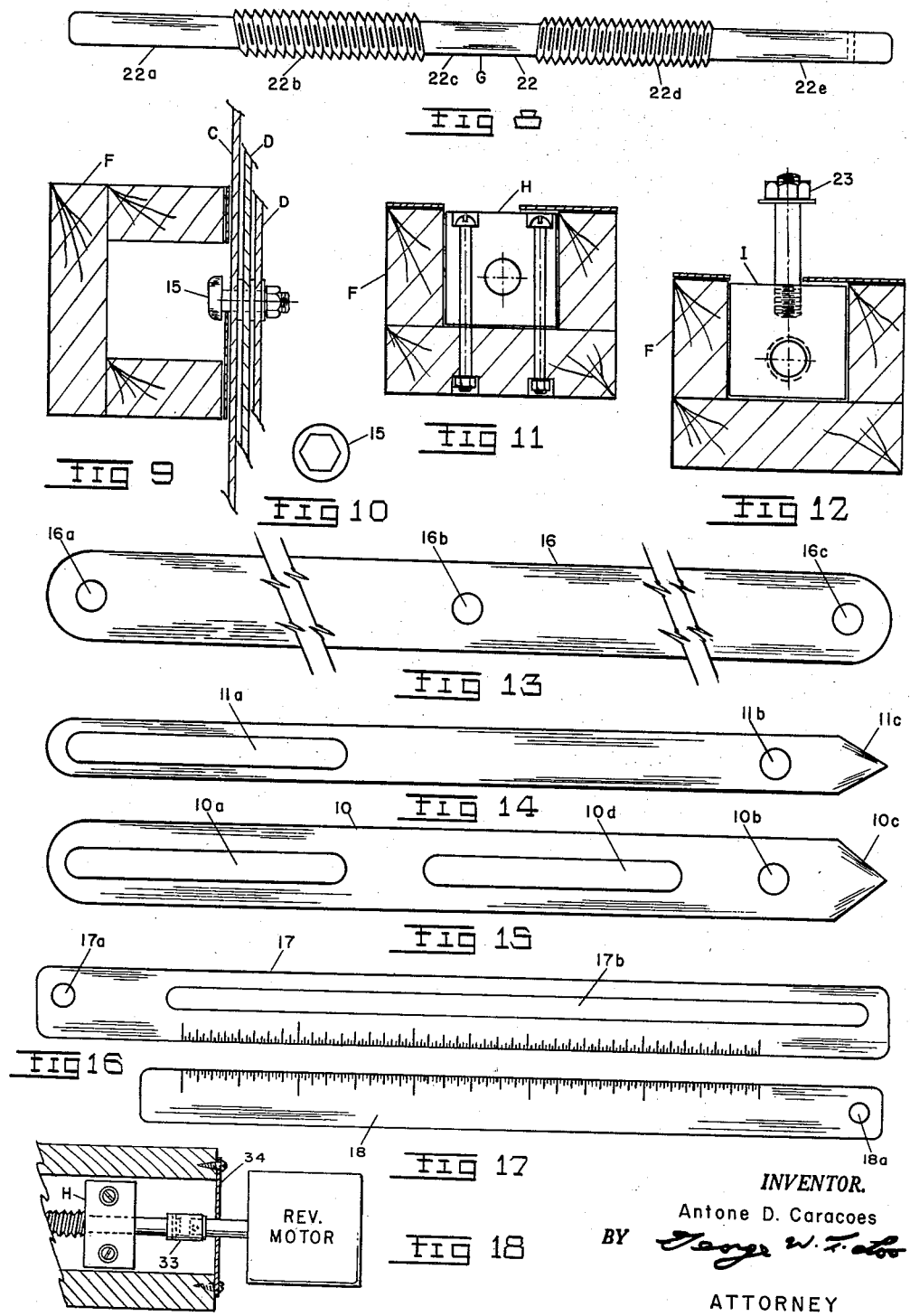

3,145,480
SPACE PLEAT FANFOLD INDICATOR AND
CALCULATOR DEVICE
Antone D. Caracoes, 924 Kawaihaos,
Honolulu 14, Hawaii
Filed Nov. 22, 1961, Ser. No. 154,230
10 Claims. (Cl. 33—192)

The present invention relates to a space pleat fanfold indicator and calculator device. It automatically determines the size and position of pleats on drape and fold points of every fanfold. By a few turns of a handle on a hand crank or by using a reversible motor an unskilled person can change space and pleat size to a larger or smaller number as desired.

Custom-made draperies are made of different material widths and are used to cover windows and doors of different widths so that it was prior to this invention practically impossible to determine accurately the pleat measurements or their position on the drape without much calculation and measurement. The pleat measurements and their position on the drape were determined by calculation and measurement. The calculation had to be done by a skilled person since there were so many variables to consider, such as the fullness of the material, length of material, width of window or door to be covered, overlap, and return. After the number of pleats were determined, the spacing of the pleats were determined. Then the position of the pleats were measured and marked on the drape and the size of pleats calculated. Sometimes because there were too many or too little pleats, a further determination was necessary to determine the spacing, position, and size of the pleats. With the use of the present invention there is no necessity to determine the size and position of pleats nor is skilled person required.

In order that a drape may present an unwrinkled appearance when it is hanged, it is necessary that each fanfold crease at the bottom of the drape be in line with the center of the pleat at top of the drape. Prior to this invention, only by measuring each fold was it possible to have each fanfold crease at the bottom of drape in line with the center of the pleat at the top of the drape. By use of this device no measuring is required.

An object of this invention is to provide a device which will automatically determine the size and position of pleats on drape and fold points of every fanfold.

Another object of this invention is to provide a device which will allow an unskilled person to change space and pleat size to a larger or smaller number as desired.

A further object of this invention is to provide a device which will eliminate the calculating of the size of pleats.

Still another object of this invention is to provide a device which will eliminate the necessity of having to measure each fold in order that each fanfold crease at the bottom of the drape will be in line with the center of the pleat at the top of the drape.

Yet another object of this invention is to provide a device which will lessen the cost of making custom-made draperies by reducing the cost of labor utilized in preparing the draperies.

A still further object of this invention is to provide a device which will allow an unskilled person to change the size of the pleats and the spacing between them to a larger or smaller width.

A further object of this invention is to provide a device which will automatically determine the size of pleats accurately irrespective of the fullness of the material to be pleated.

Yet another object of this invention is to provide a device which is easier to use and to operate than the device of Ripp et al. as disclosed and shown in Patent Number 2,853,793, issued on September 30, 1958.

A further object of this invention is to provide a method of automatically determining the size and position of pleats on drape and fold points of every fanfold.

A still further object of this invention is to provide a method which will lessen the cost of making custom-made draperies by reducing the amount of labor required to prepare pleated draperies.

Other objects, features and advantages of the present invention will be readily apparent from the following detailed description taken in conjunction with the accompanying drawings, in which:

FIGURE 1 is a perspective view of a preferred embodiment of the invention.

FIGURE 2 is a fragmentary front view of the preferred embodiment of the invention shown in FIGURE 1.

FIGURE 3 is a fragmentary front view of the preferred embodiment of the invention shown in FIGURE 2 minus the pointers, jointed links, coordinated scales, connector, and clamp.

FIGURE 4 is an enlarged sectional view taken substantially along line 1—1 of FIGURE 2.

FIGURE 5 is an enlarged sectional view taken substantially along line 2—2 of FIGURE 3.

FIGURE 6 is an enlarged sectional view taken substantially along line 3—3 of FIGURE 2.

FIGURE 7 is an isometric view of a support.

FIGURE 8 is a perspective view of a stud.

FIGURE 9 is an enlarged sectional view taken substantially along line 6—6 of FIGURE 2.

FIGURE 10 is an enlarged side view of the head of the pivot shown in FIGURE 9.

FIGURE 11 is an enlarged sectional view taken substantially along line 5—5 of FIGURE 3.

FIGURE 12 is an enlarged sectional view taken substantially along line 4—4 of FIGURE 3.

FIGURE 13 is an enlarged front view of a link.

FIGURE 14 is an enlarged front view of a pointer.

FIGURE 15 is an enlarged front view of an enlarged pointer.

FIGURE 16 is an enlarged front view of the larger of the two coordinated scales.

FIGURE 17 is an enlarged front view of the smaller of the two coordinated scales.

FIGURE 18 is a fragmentary front view of the right portion of my invention with a reversible motor instead of a hand crank.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings wherein like reference numerals refer to like and corresponding parts throughout the several views, the preferred embodiment of the invention disclosed in FIGURES 1 to 17 inclusive comprising a clamp A, a connector B, a series of pointers or spacers C connected by jointed links D, coordinated scales E, a channel-shaped frame F, a stud G, a pair of end blocks H, a pair of moving blocks I, a center block J, a hand crank K, and a pair of supports M.

In FIGURE 1 the preferred embodiment of the invention is shown on a table top and a drape to be pleated. The table top should be of a size that will accommodate the drape to be pleated. The drape to be pleated is shown in FIGURE 1 by broken lines.

Clamp A (see FIGURE 6) includes a U-shaped bar 1 with flanged ends 2 and 3, wing nut bolt 4, circular nut 5, and welded bar 6. The flanged ends each have two threaded openings 7. The circular nut 5 is welded to the base of the U-shaped bar 1 and has a threaded opening at its center. The base of the U-shaped bar 1 has a threaded opening at its center. The welded bar 6 is welded to the legs of the U-shaped bar 1 at a distance from its base, the distance being slightly greater than the thickness of the connector B. The wing nut bolt 4 has a threaded shank. A portion of said shank is threadedly engaged with the threaded openings in the circular nut and the base of the U-shaped bar while another portion extends beyond the said base. The function of said extending portion is to operate in conjunction with the welded bar 6 to hold the connector B in a stationary position.

Connector B (see FIGURE 2) is a L-shaped bar, the shorter portion of which is secured to the middle portion of pointer 10 by means of a pivot 12.

Pointers C (see FIGURES 2, 14 and 15) include an enlarged pointer 10 and a number of identical smaller pointers 11. The number of pointers 11 will vary according to the capacity desired. The greater the number of pointers, the longer will be the length of drape that may be pleated. The pointers may be numbered from left to right, with the enlarged pointer having number 1, so that the operator will not have to count in order to determine which pointer to use.

Pointer 10 is approximately twice as large in width in comparison with pointers 11. It has two elongated slots 10a and 10d, hole 10b, and a pointed end 10c. Pointers 11 each have an elongated slot 11a, hole 11b, and pointed end 11c.

Jointed links D (see FIGURES 2 and 13) include a number of bars 16. Each bar has three holes 16a, 16b, and 16c and is connected with other bars by means of pivots 13, 14, and 15. Each pivot 15 rests against the lower facing of the channel-shaped frame F (see FIGURE 9) and rides back and forth on said lower facing so as to keep the pointers C at the same height at all times and also to prevent the jointed links D from sagging. If it is desired, the circular head of pivot 15 may rest against the lower facing instead of the shank portion of pivot 15 as shown in FIGURE 4.

Coordinated scales E include (see FIGURES 2, 16 and 17) two scales 17 and 18. Scale 17 is approximately twice as wide as scale 18, but with the same dimensions. It has a hole 17a and elongated slot 17b. It is secured to center block J by means of a bolt 19, which extends from the center block J, through two holes 16b in intersecting links 16, and through hole 17a in scale 17, and a nut 23.

Scale 18 is slidably secured to two holes 16b in the intersecting links 16 by a pivot 15 which extends through the elongated slot 17b of scale 17, and through the hole 18a in scale 18. Scales 17 and 18 are coordinated so that the sum of the scales will equal the space between the centerlines of two pointed ends 11c. For example, assume the space between the centerlines of two pointed ends 11c is 8 inches, the scales should be coordinated as by setting the four inch mark on both scales in line with each other so that the sum of the scales will be 8 inches. With the scales thus coordinated one scale will indicate the size of pleats while the other will indicate the space between the pleats. The scales should be graduated into 64th of an inch intervals so that a person may make a reading to the nearest 64th inch. The inventor has found that if the scales are divided into greater intervals, the accuracy is less and if the scales are divided into lesser intervals, the scales are difficult to read.

The channel-shaped frame F (see FIGURE 4) includes a base 20 with inner surface 20a and legs 21 with inner surfaces 21a. The frame may be made in one piece or may be made of three pieces connected together. An upper facing and a lower facing are secured to the legs 12. The lower facing extends beyond the lower leg 21 and furnishes support to pivots 15 so that they ride back and forth on said lower facing. If it is desired, the circular heads of pivots 15 may rest against the lower facing instead of the shank portions of pivots 15. Also if it is desired, the upper facing and lower facing may be dispensed with and the circular heads of pivots 15 may ride back and forth on the lower inner side of the channel-shaped frame F. The upper and lower facings may be made of Masonite, wood, metal, or any other material that presents an attractive appearance and is sturdy.

The stud G (see FIGURE 8) includes a rod 22 that has an end portion 22a, a right hand threaded portion 22b, a center portion 22c, a left hand threaded portion 22d, and an end portion 22e. The end portion 22e has a circular opening which is used to connect the stud with sleeve 33.

The end blocks H (see FIGURES 3 and 11) are each secured to the channel-shaped frame F by means of two bolts which pass through holes in the block and through holes in the base 20 of the frame and two nuts. The holes in the blocks and in the base of the frame are counterbored so that the face of the head of the bolts and of the nuts do not protrude beyond the blocks and base of the frame, respectively. A hole 24 extends through the entire width of each of the blocks. The length of each block is slightly smaller than the distance between the inner surfaces 21a of the frame in order that it may fit within the said inner surfaces. The end portions 22a and 22e of the stud G fit within the hole 24 of the left and right blocks, respectively.

The moving blocks I (see FIGURES 3 and 12) include one block 25 that is right hand threaded and another block 26 that is left hand threaded. Block 25 is located on the right hand threaded portion 22b of stud G and is secured to the intersection of two bars 16 by a bolt 27, which is threaded into block 25. Block 26 is located on the left hand threaded portion 22d of stud G and is secured in the same manner as block 26. Blocks 25 and 26 are dimensioned so that their sides will move along the inner surfaces 21a of the frame F and their bottom surfaces will slide along the inner surface 20a of the base 20. These blocks cause the pointers 11 to move towards each other or away from each other depending on which direction the hand crank K is turned. Without the moving blocks 25 and 26, the accuracy of the pointers would be impaired after use of a few dozen times as the pressure would be on the jointed links themselves since the said links would be pulling or pushing one another. This pressure would weaken them and cause the pointers to be inaccurate. The moving blocks I should be perfectly centered with respect to each other in order that there will be equal pressure applied by the moving blocks.

The center block J (see FIGURES 4 and 5) includes two parts 28 and 29. It is secured to the middle portion of the frame F by means of four bolts which pass through holes in the block and through holes in the base of the frame and four nuts. The holes are counterbored so that the face of the head of the bolts and of the nuts does not protrude beyond the block and the base of the frame, respectively. A circular hole 30 extends through the entire width of the block, half of the area of the hole is located in part 28 and the other half in part 29. The center portion 22c of the stud G fits in the hole 30 and is secured thereto by a lock drive sleeve 31.

The hand crank K (see FIGURE 3) is connected to the end portion 22e of the stud G by a sleeve 33. The sleeve 33 is constructed in such a manner that when the hand crank is cranked in an off-center position stud G will be rotated without any hindrance. An example is a universal joint. A plate 34 is secured to the right end of the frame by means of screws. The plate has a hole in its center through which the shank of the hand crank passes. Instead of the hand crank K, a reversible motor may be used. An example would be a reversible motor of 1/20 horsepower that runs on 120 volts and 60 cycles at 120 revolutions per minute.

The supports M (see FIGURE 7) each includes a beam 35 with an inclined face 35a, a horizontal face 35b, and a vertical face 35c. The inclined face is approximately 15° from the horizontal. The clamp A is secured to the inclined face of the left support (see FIGURE 1). The depth of the vertical face is made so that the pointers C will be approximately 3/4 inch above the drape to be pleated. If the pointers are too close or too far from the drape, it is difficult to make accurate marking of the drape. A distance of approximately 3/4 of an inch has been determined by the inventor to be best for accurate marking of the drape.

It will be noted that washers are used to separate the links from each other, from the pointers and from nuts. Also to separate the scale 17 from nut 23 and from a link. Their use may be dispensed with if is deemed desirable to do so.

It will be also noted that the head of the pivots 15 are circular. The heads of the other pivots may be made circular if it is deemed desirable to do so. If it is desired the shape of the heads of pivots 15 may be made in other shapes.

The operation of the preferred embodiment of the space pleat fanfold indicator and calculator device is as follows: The drape, after it has been cut to length, had lengths sewed together, and had crinoline or stiffener, side hems, and bottom hem blind-stitched, is folded in half so that its lengthwise ends are together and laid out to its full width on a flat table. By folding the drape in half and putting the ends together it is possible to indicate the fold points of every fanfold by the same pointer ends. If the material is too wide for the tabletop, center fold it. Place a pin near the lengthwise ends at a distance of the overlap required for the drape plus 1/2 pleat measured from the left edge of the drape. Place another pin near the lengthwise ends at a distance of the return for the drape plus 1/2 pleat as measured from the right edge of the drape. The overlap is generally 3 1/2 inches, while 1/2 pleat is generally 2 inches so that the first pin will be placed at a distance of 5 1/2 inches from the left edge of the drape. The return, on the other hand, varies with the position of the window or door to be covered. The value of each return is determined by a person measuring the window or door to be covered. This value plus two inches is measured from the right edge of the drape and marked by a pin.

The present invention is then placed upon the table top so that the frame thereof is approximately 15° from the horizontal and the pointers are approximately 3/4 inch above the drape. If the pointers are too close or too far from the drape, it is difficult to make accurate marking. A distance of approximately 3/4 of an inch has been determined by the inventor to be best for accurate marking.

The invention is moved to the left or right until the enlarged pointer 10 is pointing at the first pin on the drape, then the clamp is tightened on the connector by a wing nut bolt so as to hold the enlarged pointer in a stationary position.

Hand crank or reversible motor is operated to turn the stud G. The stud is right hand threaded on its left side and left hand threaded on its right side. Since the enlarged pointer is stationary the turning of the stud moves the frame towards or away from the clamp and causes the moving blocks to move either towards each other or away from each other. The movement of the moving blocks causes the pointers to move towards each other or away from each other. The frame moves a distance approximately equal to the distance that the last pointer moves and in the same direction. The shank of pivots 15 rests against the lower facing of the frame and rides back and forth on said lower facing so as to keep the pointers at the same height at all times and also to prevent the jointed links from sagging. It should be noted that any slight sag will cause differences in the space measurements of the pleats. By using the moving blocks to move the pointers towards each other or away from each other, instead of the jointed links, the accuracy of the pointers in insured. For without the moving blocks, the accuracy of the pointers would be impaired after use of a few dozen times as the pressure would be on the jointed links themselves since the said links will be pulling or pushing one another. This pressure would weaken them and cause the pointers to be inaccurate.

The hand crank or reversible motor is operated until the numbered pointer corresponding to the number of pleats desired is positioned at the second pin. The pointed ends will indicate the position of the pleats and fold points of every fanfold. The position of the pleats and fold points of every fanfold is then marked with pins.

The space between the pleats may be determined by either consulting a chart of pre-calculated values or by calculating it by a formula that is dependent on where and in what manner the drape is to be used. Then the size of the pleats is determined by looking on one of the two coordinated scales after setting the space between the pleats on the other scale by use of a straight guide (not shown). This guide should extend onto the first scale and the size of the pleats is read opposite the guide. For example, if the distance between the centerlines of the two pointed ends 11c is eight inches and the space between the pleats is 3 1/2 inches, the size of the pleats will be 4 1/2 inches. The size of the pleats is determined by setting straight guide opposite 3 1/2 inches on one scale and reading 4 1/2 inches opposite the guide on the other scale.

Since materials used in draperies vary as to fullness and length, it might be necessary to vary the amounts of pleats required so as to enhance the appearance of the drape. By a few turns of the handle of the hand crank or by using a reversible motor a person can change the amount of pleats to a larger or smaller number as may be required and thus change the space and pleat size. The space and pleat size is determined as before. Thus it is seen that the use of the coordinated scales saves the necessity of calculating the pleat size.

After the size of the pleats is read off the scale, one half the value is determined by consulting a table or by merely dividing the size of the pleats by two. Then this quotient is measured off on a sewing machine and marked by an adhesive tape or a block with a scale and an adjusting screw may be utilized. The draper is folded at the points marked by the pins near the top of the drape. Using the adhesive tape or adjusting screw as a guide, the drape is then straight sewed down to the crinoline. The pleat is then formed by the sewer and tacked with a tacking machine. The drape is then ironed and folded on a line formed by the center of each pleat and each fold point, as indicated by the pins.

Although but a single embodiment of the invention has been disclosed and described herein, it is obvious that many changes may be made in the size, shape, arrangement, and detail of the various elements of the invention without departing from the scope of the novel concepts of the present invention.

I claim as my invention:

1. A space pleat fanfold indicator and calculator device comprising a frame, a series of pointers, jointed links, a stud, a pair of end blocks, a pair of moving blocks, a center block, coordinated scales, a hand crank, and a pair of supports, said frame is placed on the supports, said pointers are connected to each other by the said jointed links and pivots, said stud has two end portions, a right hand threaded portion, a center portion, and a left hand threaded portion, said end blocks are secured to the end portions of said frame and have the end portions of said stud fitted within a hole in each block, one of said moving blocks rides on the right hand threaded portion of said stud while the other rides on the left hand threaded portion of said stud, each of said moving blocks is secured to the intersection of two jointed links by a pivot, said center block is secured to the center of the frame and has a hole through which the center portion of the stud fits, one of said coordinated scales is secured at one end by a bolt and nut to said center block and is slidably secured at the other end along with an end of the other scale by a pivot which extends through two holes in intersecting links, said hand crank is operatively connected to one of the end portion of said stud.

2. A space pleat fanfold indicator and calculator device comprising a frame, a series of pointers, jointed links, a stud, a pair of end blocks, a pair of moving blocks, a center block, coordinated scales, a hand crank, a pair of supports, a clamp, and a connector, said frame is placed on the supports, said pointers are connected to each other by the said jointed links and pivots, said stud has two end portions, a right hand threaded portion, a center portion, and a left hand threaded portion, said end blocks are secured to the end portions of said frame and have the end portions of said stud fitted within a hole in each block, one of said moving blocks rides on the right hand threaded portion of said stud while the other rides on the left hand threaded portion of said stud, each of said moving blocks is secured to the intersection of two jointed links by a pivot, said center block is secured to the center of the frame and has a hole through which the center portion of the stud fits, one of said coordinated scales is secured at one end by a bolt and a nut to said center block and is slidably secured at the other end along with an end of the other scale by a pivot which extends through two holes in intersecting links, said hand crank is operatively connected to one of the end portions of said stud, said connector is slidably secured to one of said pointers on one end and on the other end by said clamp, said clamp is secured to one of the supports.

3. A space pleat fanfold indicator and calculator device comprising a frame, a series of pointers, a series of intersecting jointed links, a stud, a pair of end blocks, a pair of moving blocks, a center block, a pair of coordinated scales, a hand crank, a pair of supports, a clamp, and a connector, said frame rests upon the supports, said pointers include an enlarged pointer and a number of identical smaller pointers, all of which are connected to each other by the said jointed links and pivots, said stud has two end portions, a right hand threaded portion, a center portion, and a left hand threaded portion, said end blocks are secured to the end portions of said frame and have the end portions of said stud fitted within a hole in each block, one of said moving blocks is located on the right hand threaded portion of said stud while the other is located on the left hand threaded portion of said stud, each of said moving blocks is secured to the intersection of two jointed links by a pivot, said center block is secured to the center of the frame and has a hole through which the center portion of the stud fits, the center portion of the stud is secured within the hole by a lock drive sleeve, one of said coordinated scales is secured at one end by a bolt and a nut to said center block and is slidably secured at the other end along with an end of the other scale by a pivot which extends through two holes in intersecting links, said hand crank is operatively connected to one of the end portions of said stud by a sleeve having an universal joint at one end which will allow the hand crank to be cranked while in an off-center position, said connector is slidably secured to the enlarged pointer at one end and on the other end by said clamp, said clamp is secured to one of the supports.

4. A space pleat fanfold indicator and calculator device of claim 1, wherein one of said pointers is approximately twice as large as the other pointers and has an elongated slot in the vicinity of its middle portion, a connector is slidably secured thereto at one end and is slidably secured at the other end by a clamp.

5. A space pleat fanfold indicator and calculator device of claim 1, wherein the coordinated scales include two scales, one of said scales is approximately twice as wide as the other, but with the same dimensions, the wider scale has a hole, through which the said bolt passes that secure the scale to the said center block, and an elongated slot, the other scale has a hole through which the pivot that slidably secure it passes, said pivot also passes through two holes in the intersecting links and through the elongated slot of the first mentioned scale, the two scales are coordinated so that the sum of the scales will equal the space between the centerlines of two pointed ends of the pointers.

6. A space pleat fanfold indicator and calculator device of claim 1, wherein the frame is channel shaped and the pivots that pass through the two holes in the intersecting links have heads which rest against the frame and ride back and forth on said frame so as to keep the pointers at the same height at all times and also to prevent the jointed links from sagging.

7. A space pleat fanfold indicator and calculator device of claim 1, wherein the frame is channel shaped and has upper and lower facings secured to its legs, the lower facing extends beyond the lower leg of the frame and the pivots that pass through the two holes in the intersecting links have shanks which rest against the upper face of the lower facing and ride back and forth on said upper face.

8. A space pleat fanfold indicator and calculator device of claim 1, wherein the frame is channel shaped and has upper and lower facings secured to its legs, the lower facing extends beyond the lower leg of the frame and the heads of the pivots that pass through the two holes in the intersecting links rest on the said lower facing and ride back and forth on said lower facing so as to keep the pointers at the same height at all times and also to prevent the jointed links from sagging.

9. A space pleat fanfold indiactor and calculator device comprising a frame, a series of pointers, jointed links, a stud, a pair of end blocks, a pair of moving blocks, a center block, coordinated scales, a reversible motor, and a pair of supports, said frame is placed on the supports, said pointers are connected to each other by said jointed links and pivots, said stud has two end portions, a right hand threaded portion, a center portion, and a left hand threaded portion, said end blocks are secured to the end portions of said frame and have the end portions of said stud fitted within a hole in each block, one of said moving blocks rides on the right hand threaded portion of said stud while the other rides on the left hand threaded portion of said stud, each of said moving blocks is secured to the intersection of two jointed links by a pivot, said center block is secured to the center of the frame and has a hole through which the center portion of the stud fits, one of said coordinated scales is secured at one end by a bolt and nut to said center block and is slidably secured at the other end along with an end of the other scale by a pivot which extends through two holes in intersecting links, said reversible motor is operatively connected to one of the end portion of said stud.

10. A space pleat fanfold indicator and calculator device of claim 1, wherein the coordinated scales include two scales, one of the scales has a hole, through which the said bolt passes that secure the scale to the said center block, and an elongated slot, the outer scale has a hole through which the pivot that slidably secure it passes, said pivot also passes through two holes in the intersecting links and through the elongated slot of the first mentioned scale, the two scales are initially coordinated so that sum of the scales will equal the space between the centerlines of two pointed ends of the pointer.

References Cited in the file of this patent

UNITED STATES PATENTS

| | | |
|---|---|---|
| 231,694 | Wagner | Aug. 31, 1880 |
| 716,494 | Stuhlman | Dec. 23, 1902 |
| 736,168 | Stinson | Aug. 11, 1903 |
| 1,624,031 | Adler | Aug. 12, 1927 |
| 2,777,617 | Matt | Jan. 15, 1957 |
| 2,853,793 | Ripp et al. | Sept. 30, 1958 |
| 2,951,574 | Craig | Sept. 6, 1960 |

FOREIGN PATENTS

| | | |
|---|---|---|
| 409,861 | Germany | Feb. 13, 1925 |